United States Patent [19]

Linde et al.

[11] Patent Number: 5,389,137
[45] Date of Patent: Feb. 14, 1995

[54] PROCESS FOR DYEING ASPHALT

[75] Inventors: Günter Linde, Krefeld; Manfred Eitel, Kempen; Gerald Büchner, Krefeld-Huels; Peter Kresse; Günther Teichmann, both of Krefeld, all of Germany

[73] Assignee: Bayer AG, Leverkusen, Germany

[21] Appl. No.: 47,925

[22] Filed: Apr. 19, 1993

[30] Foreign Application Priority Data

Apr. 30, 1992 [DE] Germany .............................. 4214195

[51] Int. Cl.$^6$ .............................................. C09D 195/00
[52] U.S. Cl. ............... 106/281.1; 106/284.02; 106/272
[58] Field of Search ................. 106/281.1, 284.02, 272

[56] References Cited

U.S. PATENT DOCUMENTS

| | | | |
|---|---|---|---|
| 2,332,219 | 10/1943 | Harshberger | 106/284.02 |
| 4,332,620 | 6/1982 | Quinn | 106/281.1 |
| 4,852,870 | 8/1989 | Hawkins et al. | 272/3 |
| 4,946,505 | 8/1990 | Jungk | 106/712 |

FOREIGN PATENT DOCUMENTS

| | | |
|---|---|---|
| 0191278 | 8/1986 | European Pat. Off. . |
| 2129218 | 10/1972 | France . |
| 2363733 | 6/1975 | Germany . |

OTHER PUBLICATIONS

Orbit Abstract of FR-A-2 129 218 (Jun. 1975).
Orbit Abstract of DE-A-2 363 733 (Oct. 1972).
Orbit abstract of J74005210, (Feb. 1974).
Orbit abstract of J57205447, (Sep. 1984).
Orbit abstract of DE 3 918 694, (Oct. 1990).
"The Shell Bitumen Handbook", Shell Bitumen (1990)* no month available Table 16.1, p. 250 and Table 16.4, p. 254.
DIN 5033 (Teil 1), Mar. 1979.
DIN 51801 (Teil 2), Dec. 1980.
DIN 5033 (Teil 2), May 1992.
DIN 5033 (Teil 3), Jul. 1992.
DIN 5033 (Teil 4), Jul. 1992.
DIN 5033 (Teil 5), Jan. 1981.
DIN 5033 (Teil 6), Aug. 1976.
DIN 5033 (Teil 7), Jul., 1983.
DIN 5033 (Teil 8), Apr. 1982.
DIN 5033 (Teil 9), Mar. 1982.

*Primary Examiner*—David Brunsman
*Attorney, Agent, or Firm*—Connolly and Hutz

[57] ABSTRACT

This invention relates to a process for dyeing asphalt and/or bitumen with inorganic granulated pigments, which is characterized in that inorganic pigments, to which have been added oils which possess a kinematic viscosity at 40° C. (DIN 51 561) of 1.6 to 1,500 mm$^2$/s, and/or waxes, polyols, polyethers and paraffins with dropping points (DIN 51 801, ASTM D 566) of between 50° and 180° C. as binding agents, are granulated and mixed with the asphalt and/or bitumen.

8 Claims, No Drawings

PROCESS FOR DYEING ASPHALT

BACKGROUND OF THE INVENTION

The present invention relates to a process for dyeing asphalt and/or bitumen with inorganic granulated pigments.

The processing of pigments in powder form is increasingly considered to be critical in terms of dust development and dosing capability. On the one hand, during processing a reduction in danger and nuisance to humans and the environment is to be ensured, and on the other hand the observation of quality criteria leads to more stringent requirements in terms of colour effect. Colour effect is substantially influenced by adherence to the highest possible level of accuracy in the formulation, i.e. improved dosing leads to greater quality constancy. On the other hand, powder pigments frequently can only be dosed inaccurately on account of the adhesion forces.

Dust nuisance and poor dosing capability are of particular significance in processes which, on account of environmental regulations and the cost situation, only permit the use of cheap, low-dust pigments which are capable of being dosed. This is the case in the dyeing of asphalt-bitumen for the construction of roads and paths.

Here mainly cheap iron oxide red compounds are used in a low dosage level. However, other inorganic pigments, such as for example iron oxide yellow, titanium dioxide or chrome oxide green, are also used.

In the past there has been no lack of attempts to eliminate dust nuisance. Thus it is standard procedure for pigments for the dyeing of asphalt to be filled into plastic bags and for the total quantity of pigment, together with the packaging, to be introduced into the hot asphalt. In this case, melting point of the packaging material must be distinctly lower than the processing temperature to enable the packaging material to dissolve sufficiently rapidly. Furthermore, in the case of discontinuous mixing apparatus, adequate time must be allowed to ensure a complete and thorough dispersion of the batch of pigment.

More modern apparatus operate continuously. Here a batch-wise addition of the pigment powder is no longer possible, and for reasons of quality continuous dosing of the pigment must be provided.

Processes for the production of dust-free granulated pigments have been repeatedly described, for example for the dyeing of building materials in U.S. Pat. No. 4,946,505 and DE-A 3 918 694. The granulated pigments in question consist of micro-granules which, although dust-free and easily dosed, cannot be used for dyeing asphalt.

Granulated materials have also been described in association with asphalt. JP-A-74 005 210 has described a coating containing bitumen which is composed of metal- or metal oxide pigments, floats on the surface, and thus covers the black colour of the bitumen. In the case of only superficial dyeing, chalking and wear lead to a poorer colour effect in the case of long term use.

U.S. Pat. No. 4,852,870 has disclosed oil-coated granulated colouring pigments for the surfaces of sports areas. However, this constitutes a use outside that of typical asphalt, as the material in question is of a discrete nature and can be moved in the form of a layer on a base using a rake.

JP-A 57 205 447 describes the use of red sludge from bauxite production in the asphalt industry. Here the red sludge is converted by "flushing" into a red-brown slurry of iron oxide in oil which is then mixed with asphalt.

EP-A 191 278 describes aqueous, moist granulated iron oxide for the dyeing of building materials and bitumen compounds only from the standpoint of dust avoidance.

None of these processes combines the production and use of low-dust, free-flowing, easily dosed granulated materials with good dispersion properties for the uniform dyeing of asphalt.

Thus the object of this invention was to make available a process for dyeing asphalt which does not involve the disadvantages of the described prior art.

A process which fulfils these requirements has now been discovered.

SUMMARY OF THE INVENTION

This invention relates to a process for dyeing asphalt and/or bitumen with inorganic granulated pigments, which is characterised in that inorganic pigments, to which have been added oils which possess a kinematic viscosity at 40° C. (DIN 51562) of 1.6 to 1,500 mm$^2$/s, and/or waxes, polyols, polyethers and paraffins with dropping points (DIN 51 801, ASTM D 566) of between 50° and 180° C. as binding agents, are granulated and mixed with the asphalt and/or bitumen.

In accordance with the process corresponding to the invention it is possible to achieve a uniform through-dyeing of the asphalt at low cost. The colour effect of the asphalt thereby remains constant in the case of long-term use.

The granules used in accordance with the invention can preferably be obtained by pelletization, compaction or spray granulation, regardless of whether the production process of the pigments has included a wet phase.

Because of the processing temperature, the pigments will basically consist of inorganic pigments. The inorganic pigments, iron oxide red ($\alpha$-Fe$_2$O$_3$), iron oxide yellow ($\alpha$-FeOOH), chrome oxide green (Cr$_2$O$_3$) and/or titanium dioxide (TiO$_2$) are preferred.

These pigments must be granulated with the binding agent according to the invention which, because of its affinity to asphalt/bitumen, also does not inhibit the dispersion. Suitable cheap binding agents are on the one hand materials containing oil, like machine oil and bitumen emulsions, on the other hand waxes/paraffins. It is immaterial whether these compounds are of synthetic or natural origin. Pelletization or compaction granulation can be considered primarily as simple production processes.

Preferably the binding agents according to the invention are added in a quantity of 0.1 to 10% by weight, in particular preferably 0.5 to 6% by weight, relative to the inorganic pigments.

It is also possible to use binding- and dispersing agents of different types. Thus inorganic binding agents, e.g. salts such as water glass, phosphates, borates, silicates, aluminates and combinations thereof, can additionally be used. This type of production can be combined with a following aftertreatment of the granules with the binding agents according to the invention which are soluble in asphalt. However, compounds comprising larger organic molecules, such as lignin sulphonate or molasses, starch or paraffin, can also additionally be used in the production of the granules according to the invention. However, none of the additives should impair the properties of the end products in terms of their serviceability.

Suitable test procedures (with the range of function values) are: Marshall stability test 3.3 to 8 kN; Marshall flow value test 2.0 to 4.0 mm; porosity test 3.0 to 5.0%.

This specification of the properties of use is given in: "The Shell Bitumen Handbook", Shell Bitumen 1990, Table 16.1, p. 250 and Table 16.4, p. 254.

With this range of properties of function values for practical use, the conventional testing of the pigmented specimens does not result in an adequate differentiation of the differently formulated pigments (granules with binding agent).

Visual testing of the Marshall specimens indicates an improvement in the granulated materials produced using oil. However, on account of the roughness of the surface, measurements carried out on dark specimens are not always reproducible.

The colouring of the different granulated materials can be adequately described in the following test process.

Dispersion Test in Light Bitumen 100 ml of a light bitumen (Mexphalt C, commercial product of Shell AG) is heated to 180° C. and then fed into a 250 ml tin can. To test the dispersibility, an automatic dispersing machine was used (disc: diameter 4 cm, 3,500 rpm). In each case 10 g pigment was stirred in for a stirring time of 20 s. Then the bitumen/pigment mixture was applied using a film drawing device (150 μm layer thickness).

The finished bitumen coatings on galvanized iron sheets are measured using a reflectance photometer (Minolta, Chromameter II) and the colourmetric data is evaluated in the CIELAB system (DIN 5033; DIN 6174). To adjust the colour tone, in this case the $a^*$-value is selected. The greater the $a^*$-value is (in the positive range), the redder the specimen. Differences in two units of the $a^*$-value fall within the accuracy range of the preparation and are not visually apparent. Differences of >4 units of the $a^*$-value are distinctly visible.

Dispersion Test in Normal Bitumen

In contrast to light types of bitumen as described in the aforegoing, normal road construction bitumen can be tested only with great difficulty, on account of its very dark, black colour tone. In such cases the addition of pigments must be increased approximately to the ratio 1:1 (pigment:bitumen); in comparison, in the case of light bitumen the ratio is only approximately 1:10 (pigment:bitumen), then differences in colour tone after the dispersion test are noticeable.

100 ml bitumen B 80 (road construction bitumen class B 80, manufacturer Shell AG) is heated and then, as previously, 100 g pigment are introduced using an automatic dispersion machine. To obtain a sufficiently freely flowing bitumen, heating to 230° C. must be carried out. The remainder of the process and the evaluation are carried out as described in the aforegoing.

In the following the invention will be explained in the form of examples, which are not to be considered limiting.

EXAMPLE 1

25 kg iron oxide red Bayferrox 130 (commercial product of Bayer AG), in a mixer was sprayed with 3% (0.75 kg) machine oil V 100 ("Energol RC 100 ISO", commercial product of Dt. BP AG, lubricating oil in accordance with DIN 51 506 VDL, kinematic viscosity at 40° C. (DIN 51 562) 100 mm²/s) and intensively mixed. This mixture was granulated in a conventional pan granulator. The granules thus obtained possess a maximum diameter of up to 3 mm and some granules possess diameters of 8 to 10 mm. These granules were tested in accordance with the above described procedures. The reference material consisted of powder of Bayferrox 130, spray granulated material with no additives, spray granulated material with 0.5% sodium water glass, spray granulated material with 5% lignin sulphonate.

| Coatings in Mexphalt C[1]) Δ $a^*$-values according to CIELAB | |
|---|---|
| Sample | Δ $a^*$-values[2]) |
| Without pigment | 0 |
| Bayferrox 130 powder | 18.6 |
| Granulated material with 3% machine oil V 100 | 17.4 |
| Granulated material with 0.5% sodium water glass | 1.4 |
| Granulated material with 5% lignin sulphonate | 2.6 |
| Granulated material with no additives | 3.0 |

[1])Commercial product of Shell AG
[2])Δ $a^*$-value pigmented sample - $a^*$-value unpigmented sample

| Coatings with B 80-bitumen[3]) Δ $a^*$-values according to CIELAB | |
|---|---|
| Sample | Δ $a^*$-values[4]) |
| Without pigment | 0 |
| Granulated material with 3% machine oil V 100 | 1.1 |
| Granulated material with 0.5% sodium water glass | 0.2 |
| Granulated material with 5% lignin sulphonate[5]) | — |
| Granulated material with no additive | 0.5 |

The visual impression confirms the results obtained by the two dispersion tests: the higher the $a^*$-value, the more marked is the red tone. This difference in the coatings is confirmed by the visual impression of Marshall specimens.
[3])Road construction bitumen of Class B 80, manufacturer Shan AG
[4])Δ $a^*$ = $a^*$-value pigmented specimen - $a^*$-value unpigmented specimen
[5])Decomposition at the incorporation temperature

EXAMPLE 2

In each case 1 kg iron oxide Bayferrox 130 (commercial product of BAYER AG) was granulated on a conventional pan granulator by spraying 3% molten wax on it. The bed of granules was heated for 10 minutes above the melting point of the respective wax. The granules thus obtained mainly possess a diameter of 1 to 5 mm. These granules were tested by the above described procedure in Mexphalt C (commercial product of Shell AG). The reference material consisted of powder of Bayferrox 130, spray granulated material with 5% lignin sulphonate, granulated material with 3% machine oil V 100.

| Wax | Dropping point °C. (DIN 51 80[1]) |
|---|---|
| Paraffin | 71–75 |
| Luwax A (polyethylene wax, commercial product of BASF AG) | 103–110 |
| Luwax EVA 2 (polyethylene wax, commercial product of BASF AG) | 90–95 |
| PE 520 (polyethylene wax, commercial product of Hoechst AG) | 119 |

Coatings in Mexphalt C[1])

| a*-values according to CIELAB | |
|---|---|
| Specimen | Δ a*-values[2] |
| Without pigment | 0 |
| Bayferrox 130 powder | 15.8 |
| Granulated material with 3% paraffin | 9.9 |
| Granulated material with 3% Luwax A | 14.9 |
| Granulated material with 3% Luwax EVA 2 | 11.8 |
| Granulated material with 3% PE 520 | 10.8 |
| Granulated material with 5% lignin sulphonate | 0.5 |
| Granulated material with 3% machine oil V 100 | 13.5 |

[1] Commercial product of Shell AG
[2] Δ a* = a*-value pigment sample - a*value unpigmented sample

What is claimed is:

1. A process for dyeing at least one of asphalt and bitumen with inorganic granulated pigments, wherein inorganic pigments, to which have been added at least one binding agent in a quantity of 0.1 to 10% by weight, relative to the inorganic pigments, said binding agent being selected from the group consisting of oils, waxes, polyols, polyethers and paraffins, are granulated and mixed with the at least one of asphalt and bitumen, further wherein said oils have a kinematic viscosity at 40° C. of 1.6 to 1,500 mm$^2$/s and said waxes, polyols, polyethers and paraffins have dropping points of between 50° and 180° C.

2. A process as claimed in claim 1, wherein the granulation is carried out by pelletization, compaction or spray granulation.

3. A process as claimed in claim 2, wherein the inorganic pigments comprise at least one pigment selected from the group consisting of iron oxide red, iron oxide yellow, chrome oxide green and titanium dioxide.

4. A process as claimed in claim 3, wherein the at least one binding agent is added in a quantity of 0.5 to 6% by weight, relative to the inorganic pigments.

5. A process as claimed in claim 2, wherein the at least one binding agent is added in a quantity of 0.5 to 6% by weight, relative to the inorganic pigments.

6. A process as claimed in claim 1, wherein the inorganic pigments comprise at least one pigment selected from the group consisting of iron oxide red, iron oxide yellow, chrome oxide green and titanium dioxide.

7. A process as claimed in claim 6, wherein the at least one binding agent is added in a quantity of 0.5 to 6% by weight, relative to the inorganic pigments.

8. A process as claimed in claim 1, wherein the at least one binding agent is added in a quantity of 0.5 to 6% by weight, relative to the inorganic pigments.

* * * * *